United States Patent
Swasey et al.

(10) Patent No.: US 11,181,196 B2
(45) Date of Patent: Nov. 23, 2021

(54) MULTILAYER STATIC GASKET, DISTANCE LAYER WITH IMPROVED STOPPER REGION THEREFOR, AND METHOD OF CONSTRUCTION THEREOF

(71) Applicant: TENNECO INC., Lake Forest, IL (US)

(72) Inventors: Thomas W. Swasey, Okemos, MI (US); Michael J. Davidson, Ann Arbor, MI (US)

(73) Assignee: Tenneco Inc., Lake Forest, IL (US)

(*) Notice: Subject to any disclaimer, the term of this patent is extended or adjusted under 35 U.S.C. 154(b) by 117 days.

(21) Appl. No.: 16/576,985

(22) Filed: Sep. 20, 2019

(65) Prior Publication Data

US 2020/0011421 A1 Jan. 9, 2020

Related U.S. Application Data

(62) Division of application No. 14/975,263, filed on Dec. 18, 2015.

(60) Provisional application No. 62/094,706, filed on Dec. 19, 2014.

(51) Int. Cl.
    *F16J 15/08* (2006.01)
    *B21D 13/02* (2006.01)
    *F02F 11/00* (2006.01)

(52) U.S. Cl.
    CPC .......... *F16J 15/0818* (2013.01); *B21D 13/02* (2013.01); *F02F 11/002* (2013.01); *F16J 15/0825* (2013.01); *F16J 15/0887* (2013.01); *F16J 2015/0868* (2013.01)

(58) Field of Classification Search
    CPC .. F16J 15/0818; F16J 15/0825; F16J 15/0881; F16J 15/0887; B21D 13/02; B21D 22/02; B21C 23/06; B21C 23/18
    See application file for complete search history.

(56) References Cited

U.S. PATENT DOCUMENTS

| | | | | |
|---|---|---|---|---|
| 3,415,096 A | * | 12/1968 | Griswold | H01B 13/0009 72/196 |
| 3,828,705 A | * | 8/1974 | Morrison | B21D 13/02 72/332 |
| 4,233,833 A | * | 11/1980 | Balinski | B21D 13/045 72/180 |
| 4,450,706 A | * | 5/1984 | Engelmohr | B21D 13/02 378/149 |

(Continued)

*Primary Examiner* — Edward T Tolan
(74) *Attorney, Agent, or Firm* — Robert L. Stearns; Dickinson Wright, PLLC

(57) ABSTRACT

A multilayer static gasket, stopper region containing distance layer therefor and methods of construction thereof are provided. The gasket includes at least one metal functional layer and at distance layer including a stopper region. The functional layer has a seal bead surrounding at least one passage to be sealed. The distance layer has a thickness extending between generally planar opposite sides, with each of the opposite sides of the distance layer having a plurality of protrusions extending outwardly therefrom and a plurality of depressions extending inwardly therein, wherein the protrusions and depressions form the stopper region. Each of the depressions extends into a separate protrusion, thereby forming an underside of the associated protrusion. The depressions extend into the opposite sides of the distance layer a distance that is equal to or greater than ½ of the thickness of the distance layer.

9 Claims, 7 Drawing Sheets

(56) References Cited

U.S. PATENT DOCUMENTS

| | | | |
|---|---|---|---|
| 6,814,357 B2* | 11/2004 | Diez | F16J 15/0825 277/593 |
| 8,128,098 B2* | 3/2012 | Plunkett | F16J 15/0825 277/593 |
| 8,151,617 B2* | 4/2012 | Feng | F28F 1/128 72/379.6 |
| 8,336,889 B2* | 12/2012 | Unseld | F16J 15/0825 277/594 |
| 2007/0013145 A1* | 1/2007 | Detmann | F16J 15/0825 277/593 |
| 2008/0174075 A1* | 7/2008 | Diez | F16J 15/0825 277/595 |
| 2010/0117306 A1* | 5/2010 | Okuno | F16J 15/0825 277/592 |
| 2013/0249171 A1* | 9/2013 | Kolb | F16L 23/20 277/608 |

* cited by examiner

MULTILAYER STATIC GASKET, DISTANCE LAYER WITH IMPROVED STOPPER REGION THEREFOR, AND METHOD OF CONSTRUCTION THEREOF

CROSS-REFERENCE TO RELATED APPLICATION

This U.S. Divisional Applications claims the benefit of U.S. Utility application Ser. No. 14/975,263, filed Dec. 18, 2015 and U.S. Provisional Application Ser. No. 62/094,706, filed Dec. 19, 2014, both of which are incorporated herein by reference in their entirety.

BACKGROUND OF THE INVENTION

1. Technical Field

This invention relates generally to static gaskets of the type used to establish a gas/fluid-tight seal between two members to be clamped together, and more particularly to multilayer static gaskets having a function layer with a seal bead and a separate stopper layer.

2. Related Art

In establishing a gas/fluid-tight seal between two members to be clamped together, such as a cylinder head and engine block or an exhaust manifold and a cylinder head, for example, it is common to use a static gasket having multiple layers. Generally, at least one of the layers of the multilayer gasket, sometimes referred to as a functional layer, has a seal bead to facilitate establishing a gas/fluid-tight seal. Another of the layers, sometimes referred to as a distance layer or stopper layer, is configured to abut the functional layer in an effort to prevent the seal bead of the functional layer from becoming completely flattened. If, while fastening the members to be clamped together, the seal bead is over-compressed and substantially flattened, in addition to the seal bead losing its ability to exert a high compression sealing pressure, fatigue cracks can form in the area of the seal bead, such as during clamping or while in use. The fatigue cracks ultimately reduce the ability of the static gasket to establish an air and/or fluid-tight seal, thereby potentially diminishing the life and performance of the engine. As such, it is important that the stopper layer perform its intended function, while also being economical in manufacture.

SUMMARY OF THE INVENTION

A multilayer static gasket is provided for providing a gas/fluid tight seal between two members to be clamped together. The gasket includes at least one metal functional layer having at least one functional layer opening. Each functional layer opening is configured to surround a passage to be sealed. The at least one functional layer includes a seal bead radially outwardly from and substantially surrounding the at least one functional layer opening. The gasket further includes a metal distance layer having a thickness extending between generally planar opposite sides. The distance layer has at least one distance layer opening extending through the opposite sides, with each distance layer opening being configured to register with a separate one of the functional layer openings and with the passage to be sealed. Each of the opposite sides of the distance layer has a plurality of protrusions extending outwardly therefrom and a plurality of depressions extending inwardly therein, wherein the protrusions and depressions form a stopper region of the distance layer. Each of the plurality of depressions in the opposite sides extend into separate ones of the protrusions on an opposite side, thereby forming an underside of the associated protrusion. The depressions extend into the opposite sides of the distance layer a distance that is equal to or greater than ½ of the thickness of the distance layer, such that the depressions extend into the opposite sides of the stopper region a distance that is equal to or greater than ½ of the thickness of the stopper region.

In accordance with another aspect of the invention, the protrusions each have an annular wall extending about a corresponding one of the depressions, wherein the annular walls can have a wall thickness that is less than the thickness of the distance layer, while maintaining a sufficient strength to prevent the seal bead of the functional layer from being completely flattened.

In accordance with another aspect of the invention, the wall thicknesses of the protrusion annular walls can be less than ½ of the final thickness of the distance layer extending between the substantially planar opposite sides.

In accordance with another aspect of the invention, the wall thicknesses of the protrusion annular walls can be about ⅓ of the final thickness of the distance layer extending between the substantially planar opposite sides.

In accordance with another aspect of the invention, the annular walls of the protrusions can have a wall thickness that is equal to or greater than the thickness of the distance layer.

In accordance with another aspect of the invention, the annular walls of the protrusions can be inclined in oblique relation to the substantially planar opposite sides to further enhance the crush strength of the protrusions.

In accordance with another aspect of the invention, at least some of the annular walls of different protrusions can be inclined at different angles relative to one another to fine tune a smooth load distribution across the gasket upon being clamped between members to be sealed.

In accordance with another aspect of the invention, at least some of the protrusions can have different heights relative to one another and at least some of the depressions can have different depths relative to one another to fine tune the smooth load distribution across the gasket upon being clamped between members being sealed.

In accordance with another aspect of the invention, at least some of the annular walls can have a different stiffness or crush strength relative to one another to fine tune the smooth load distribution across the gasket upon being clamped between members being sealed.

In accordance with another aspect of the invention, a distance layer for a multilayer static gasket is provided. The distance layer has a metal layer with a thickness extending between substantially planar opposite sides and at least one distance layer opening extending through the opposite sides, wherein each distance layer opening is configured to register with a passage to be sealed. Each of the opposite sides has a plurality of protrusions extending outwardly therefrom and a plurality of depressions extending inwardly therein. The plurality of depressions in each of the opposite sides are directly opposite the protrusions on an opposite side, thereby forming an underside thereof, wherein the depressions extend into the opposite sides a distance equal to or greater than ½ the thickness of the distance layer.

In accordance with another aspect of the invention, a method of constructing a multilayer metal static gasket for establishing a gas/fluid-tight seal between two members to be clamped together is provided. The method includes forming a metal functional layer having at least one opening configured to surround a passage to be sealed and having an annular seal bead radially outwardly from and substantially surrounding the opening. The method further includes providing a metal distance layer having an original thickness extending between substantially planar opposite sides, and forming at least one distance layer opening through the opposite sides, with each distance layer opening being configured to register with a separate functional layer opening. Further yet, the method includes compressing the distance layer between a pair of dies and forming a plurality of depressions extending into each of the opposite sides and a plurality of protrusions extending outwardly from each of the opposite sides, wherein the depressions extend into the opposite sides a distance equal to or greater than ½ of the original thickness of the distance layer.

In accordance with another aspect of the invention, the method further includes causing a cold flow and simultaneous drawing of the material of the metal distance layer during the compressing process.

In accordance with another aspect of the invention, the method includes forming each of the protrusions having an annular wall extending about a separate corresponding one of the depressions and can include drawing the material of the annular wall to have a reduced thickness from the original thickness of the metal distance layer, and can include reducing the wall thickness to between about ½-⅓ of the final thickness of the metal stopper layer.

In accordance with another aspect of the invention, the method can include forming the wall thickness of the protrusions being substantially the same or increased relative to the original thickness of the metal distance layer.

In accordance with another aspect of the invention, the method can include forming each of the annular walls being inclined in oblique relation to the opposite sides of the metal distance layer.

In accordance with another aspect of the invention, the method can include forming at least some of the annular walls having different angles of inclination from one another relative to the substantially planar opposite sides to fine tune the smooth load distribution applied across the gasket during use.

In accordance with another aspect of the invention, the method can include forming at least some of the protrusions having different heights from one another relative to the substantially planar opposite sides and forming at least some of the depressions having different depths from one another relative to the substantially planar opposite sides to fine tune the smooth load distribution applied across the gasket during use.

In accordance with another aspect of the invention, the method can include forming at least some of the annular walls having a different stiffness relative to one another to fine tune the smooth load distribution applied across the gasket during use.

BRIEF DESCRIPTION OF THE DRAWINGS

These and other aspects, features and advantages of a multilayer gasket constructed in accordance with the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
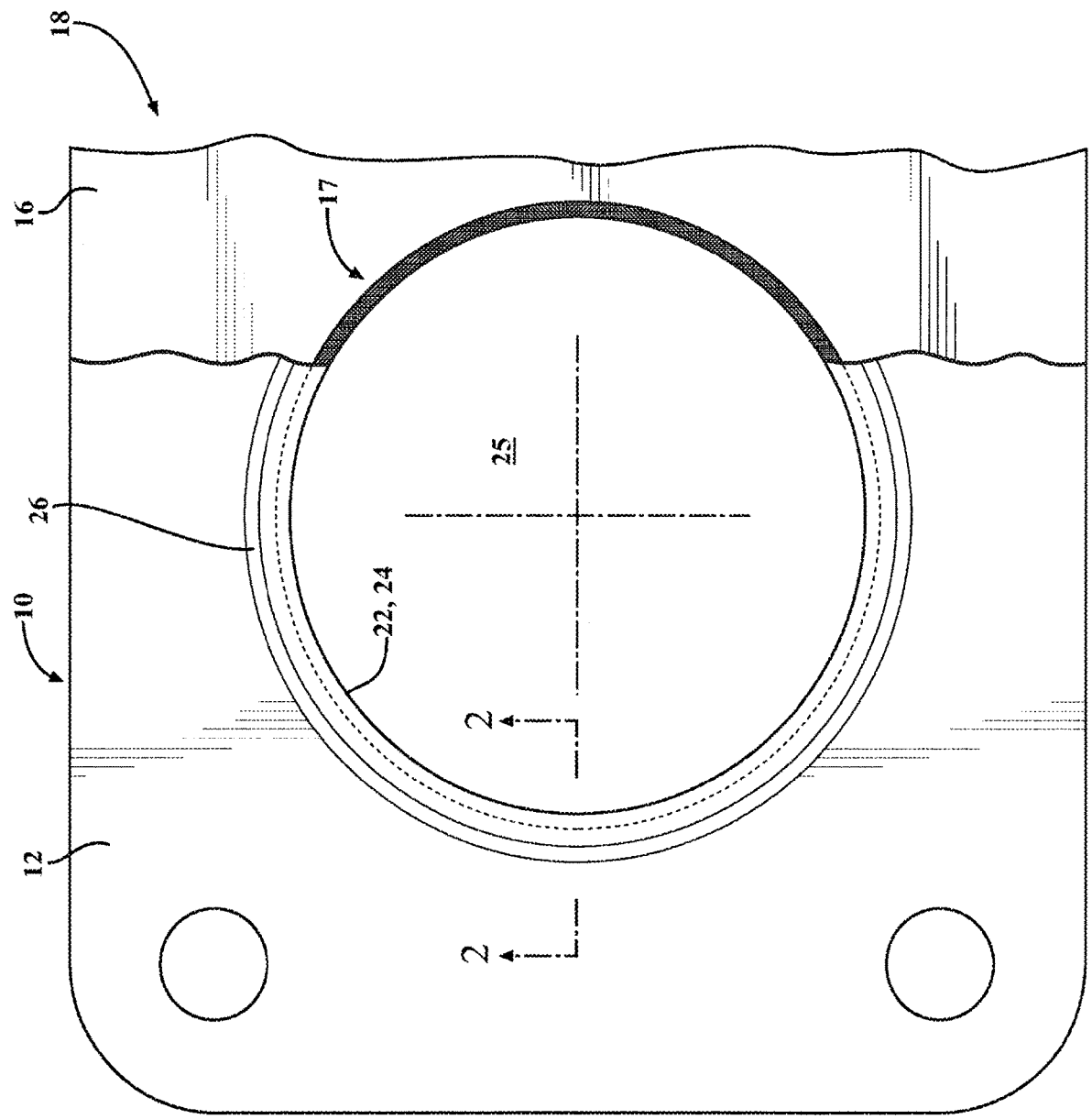
FIG. 1 is fragmentary, partially broken away, top view of a multilayer static gasket constructed in accordance with one aspect of the invention.
Figure 2:
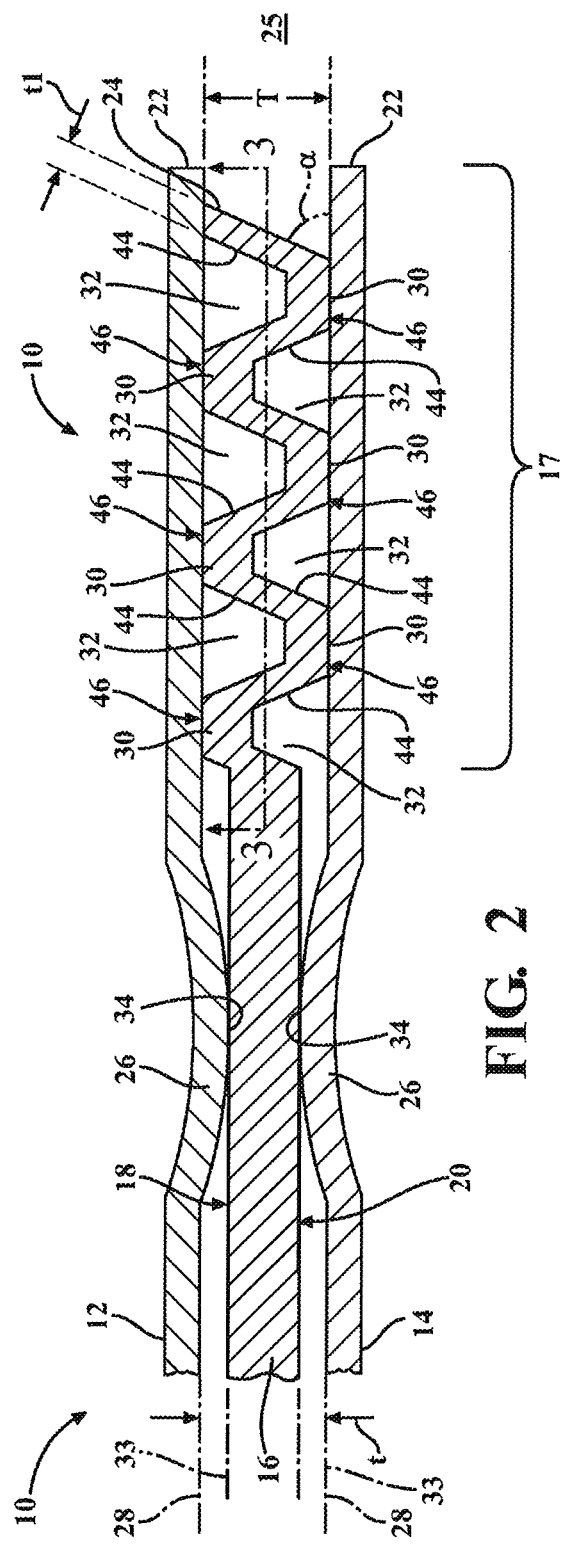
FIG. 2 is a cross-sectional side view of the multilayer static gasket taken generally along the line 2-2 of FIG. 1.

Referring in more detail to the drawings, FIGS. 1 and 2 illustrate a multilayer static gasket 10, referred to hereafter as gasket, constructed in accordance with one aspect of the invention. The gasket 10 is particularly useful as a cylinder head gasket or exhaust manifold gasket, by way of example and without limitation. The gasket 10 has at least one functional layer, represented here as a pair of functional layers 12, 14, and a distance layer 16 having a stopper region 17. The functional layers 12, 14 are arranged to abut opposite sides 18, 20 of the distance layer 16, such that the distance layer 16 is sandwiched between the functional layers 12, 14. The functional layers 12, 14 each have an opening 22 sized to at least partially register with an opening 24 in the stopper region 17 of the distance layer 16, wherein the respective openings 22, 24 are each arranged to register with one another and with a corresponding passage 25 to be sealed, such as a cylinder bore or exhaust port. The functional layers 12, 14 each have compression seal beads, such as full compression seal beads 26, for example, extending outwardly from substantially parallel planes 28 of the layers 12, 14 a predetermined distance to facilitate establishing a fluid/gas-tight seal about the passage being sealed. The stopper region 17 of the distance layer 16 has a plurality of protrusions 30 extending outwardly from each of the opposite sides 18, 20 and a plurality of depressions 32 extending inwardly into the opposite sides 18, 20. Corresponding ones of the protrusions 30 and depressions 32 are directly opposite one another, such that each depression 32 on one side 18, 20 of the distance layer 16 extends into a corresponding protrusion 30 on an opposite side of the distance layer 16. The "as formed" protrusions 30 have a height extending outwardly from opposite parallel planes 33 of the opposite sides 18, 20 that is slightly less than the height of the "as formed" seal beads 26, wherein the protrusions 30 have a stiffness that prevents the seal beads 26 from being completely flattened upon establishing a gas/fluid-tight seal between two members to be clamped together, e.g. cylinder head/engine block or exhaust manifold/engine block. As such, the seal beads 26 are assured of maintaining a generally constant, high sealing pressure against the distance layer 16, thereby providing a fluid/gas-tight seal about the passage 25 being sealed, and further, the seal beads 26 remain free from the formation of premature fatigue cracks as a result of not being over-compressed and flattened.

The functional layers 12, 14 are constructed from a resilient metal, such as spring steel, for example, and can be provided having a thickness of about 0.1 to 0.3 mm, or greater, for example. The functional layers 12, 14, as shown in FIG. 2, are constructed having mirrored profiles facing one another, with each having the aforementioned seal beads, shown as full seal beads 26 adjacent the openings 22. The full beads 26 are shown as each having circumferentially extending peaks 34 facing one another for fluid/gas-tight sealing abutment with the opposite planar sides the stopper layer 16. Upon being compressed between the members being clamped together, the full beads 26 are only partially compressed due to the stiffness and presence of the adjacent protrusions 30 of the stopper layer 16. Accordingly, the full beads 26 remain elastically biased to retain their ability to establish high sealing pressures to form gas and fluid-tight seals.

Figure 3:
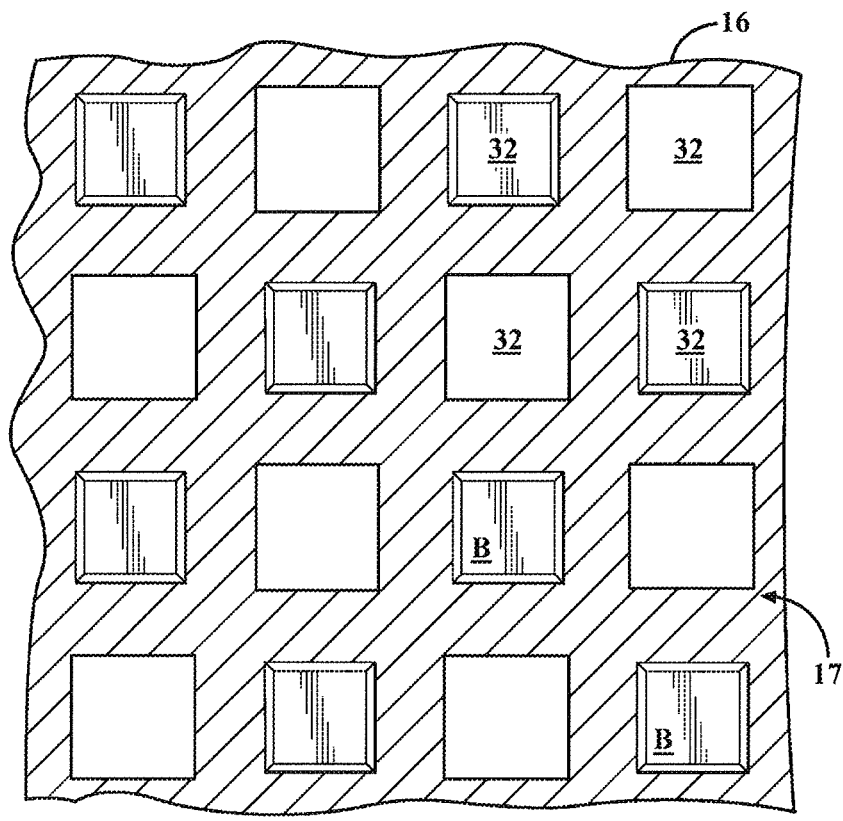
FIG. 3 is fragmentary cross-sectional plan view of a stopper region of a distance layer of the multilayer static gasket taken generally along the line 3-3 of FIG. 2.
Figure 4:
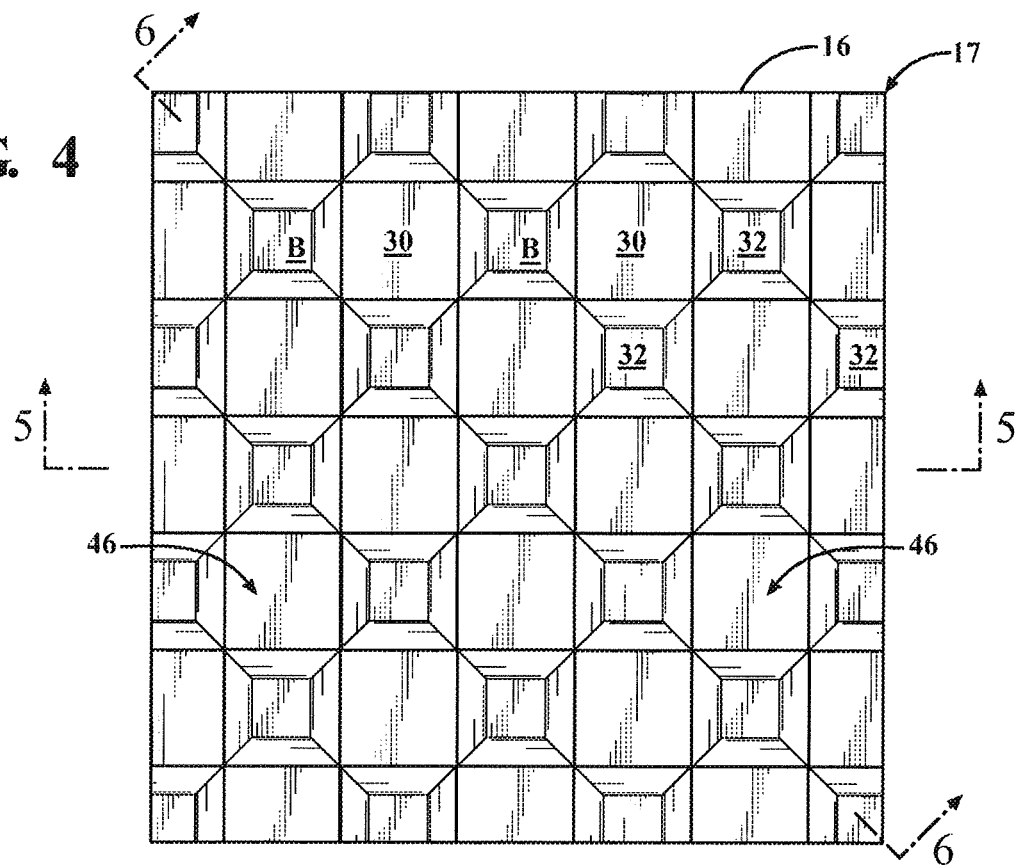
FIG. 4 is fragmentary plan view of a stopper region of a distance layer constructed in accordance with one embodiment of the invention.
Figure 5:
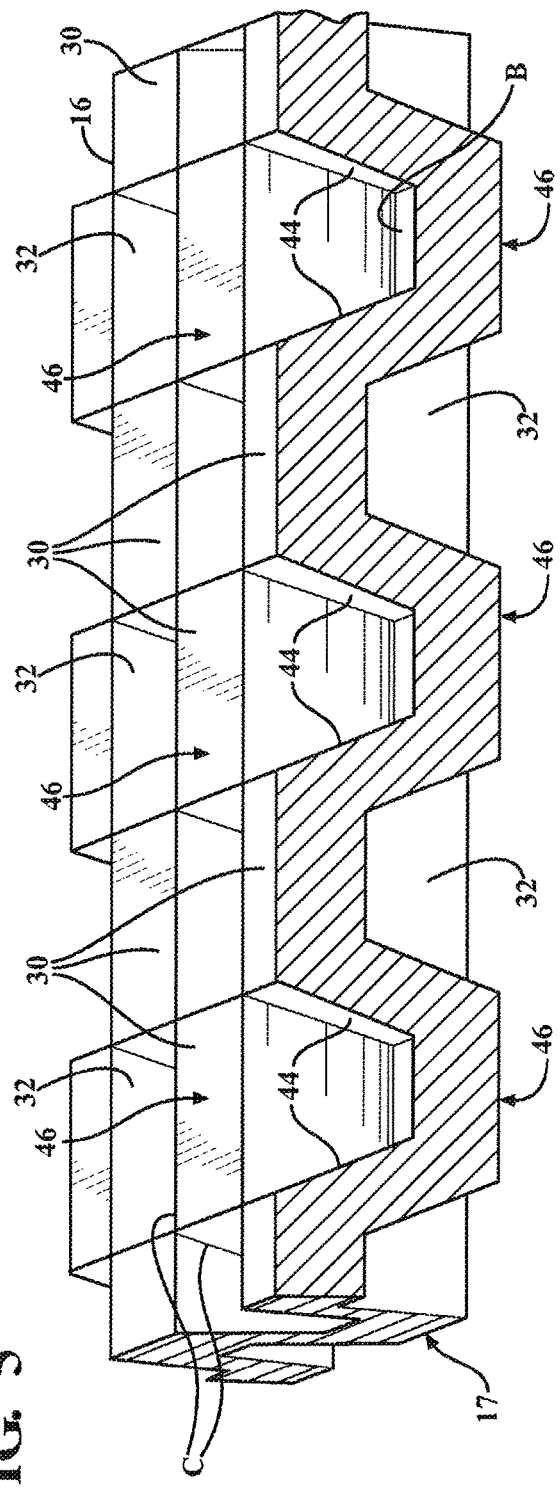
FIG. 5 is cross-sectional perspective view taken generally along the line 5-5 of FIG. 4.
Figure 10:
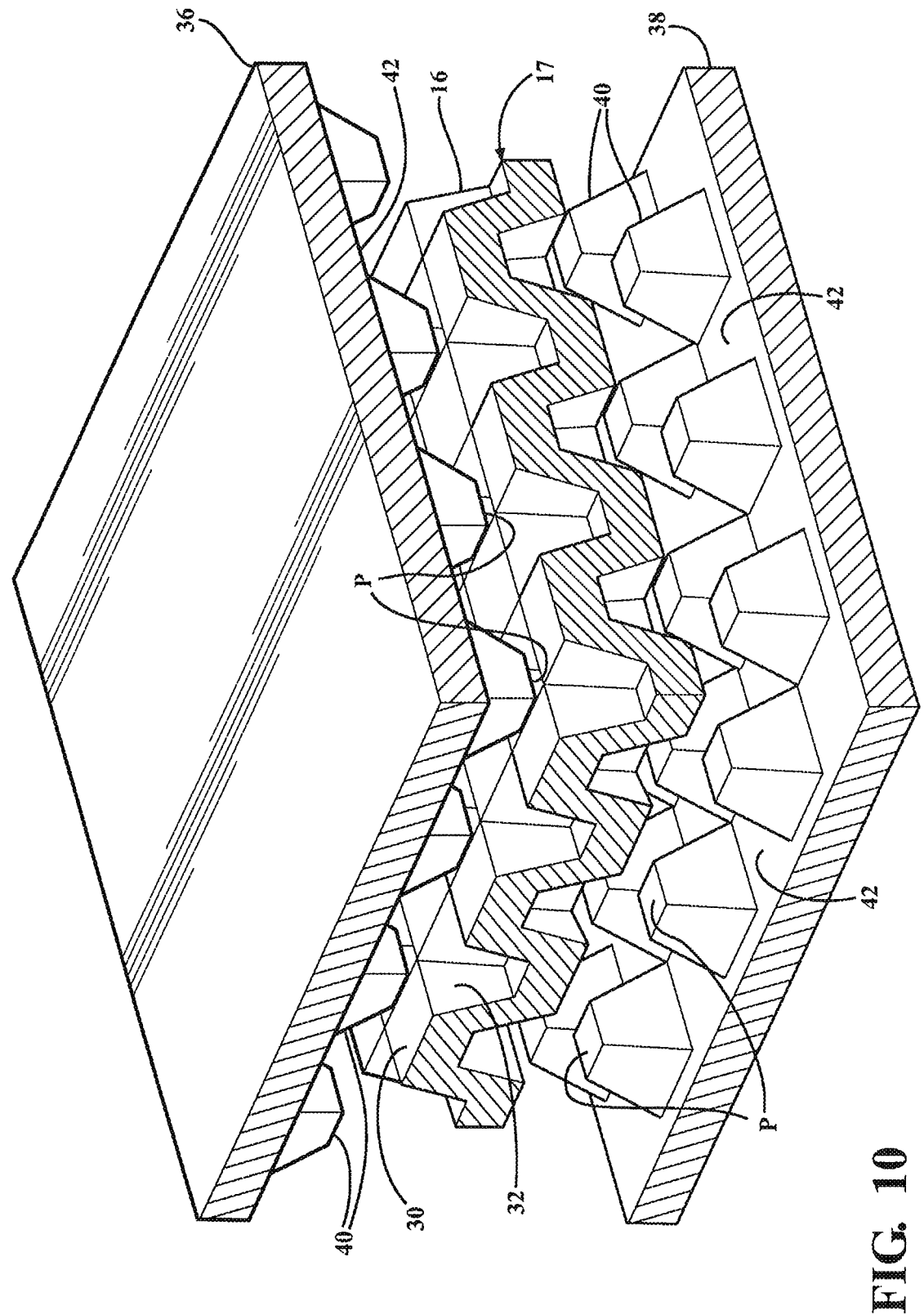
FIG. 10 is a fragmentary view of a stopper region of a distance layer being formed by pair of dies in accordance with another aspect of the invention.

The distance layer 16 can be constructed from a relatively rigid metal material, such as cold rolled sheets of steel or stainless steel, for example. The metal used to construct the distance layer 16 has a generally uniform thickness (t) extending between the opposite, generally parallel, planar sides 18, 20. During construction, the sheet metal is compressed between a pair of dies 36, 38 (FIG. 10), wherein each die 36, 38 is provided with a predetermined pattern of projections 40 and voids 42 between the projections 40. The projections 40 ultimately form the depressions 32, while the voids 42 ultimately form the protrusions 30. The dies 36, 38 are configured relative to one another so that the projections 40 on one die 36 extend into the voids 42 on the opposite die 38, and vice versa, and thus, the projections 40 on one die 36 intermesh with the projections 40 on the opposite die 38 to precisely control the finished height (T) of the stopper region 17. Accordingly, plateaus (P) of the projections 40 on one die 36 extend beyond plateaus (P) of the projections 40 on the opposite die 38 while deforming the sheet metal of the distance layer 16. As such, during formation of the protrusions 30, the metal material of the stopper layer 16 is caused to both cold form and draw, wherein cold forming causes some of the material to be wholly displaced and wherein drawing causes some of the material to stretch in tension and shear. With the projections 40 of the dies 36, 38 being received in the voids 42 of the dies 36, 38, such that plateaus (P) of the oppositely facing projections 40 are at least coplanar with one another, and preferably extend beyond one another, the depressions 32 are formed such that they extend into the opposite sides 18, 20 of the metal sheet material of the distance layer 16 a distance equal to or greater than ½ of the original thickness (t) of the metal sheet material, and can be formed to extend up to about 75 percent of the thickness (t) into the opposite sides 18, 20. Accordingly, the base (B) or bottom surfaces of the depressions 32 formed in one side 18 of the distance layer 16 extend in coplanar fashion with, or beyond the base (B) or bottom surfaces of the depressions 32 formed in the opposite side 20 of the distance layer 16, and thus, the depressions 32 extend to a depth of at least ½ or more of the finished height (T) of the stopper region 17. This is evidenced in FIGS. 2 and 3, wherein FIG. 3 shows a cross-section taken generally along a central plane of the distance layer 16 thickness (t), which in turn results in a waffle-like pattern on both sides of the cross-section, with a portion of the depressions 32 remaining present (shaded areas represent the bottoms of depressions 32 on one side of the stopper region 17 while non-shaded areas represent through openings formed by depressions 32 on the opposite side of the stopper region 17. It should be understood that the through openings exist as a result of the bases B of the opposite depression being cutoff as a result of the cross-section). As best seen in FIG. 2, with the depressions 32 extending into opposite protrusions 30, it should be recognized that the depressions 32 form undersides of the corresponding opposite protrusions 30.

Figure 7:
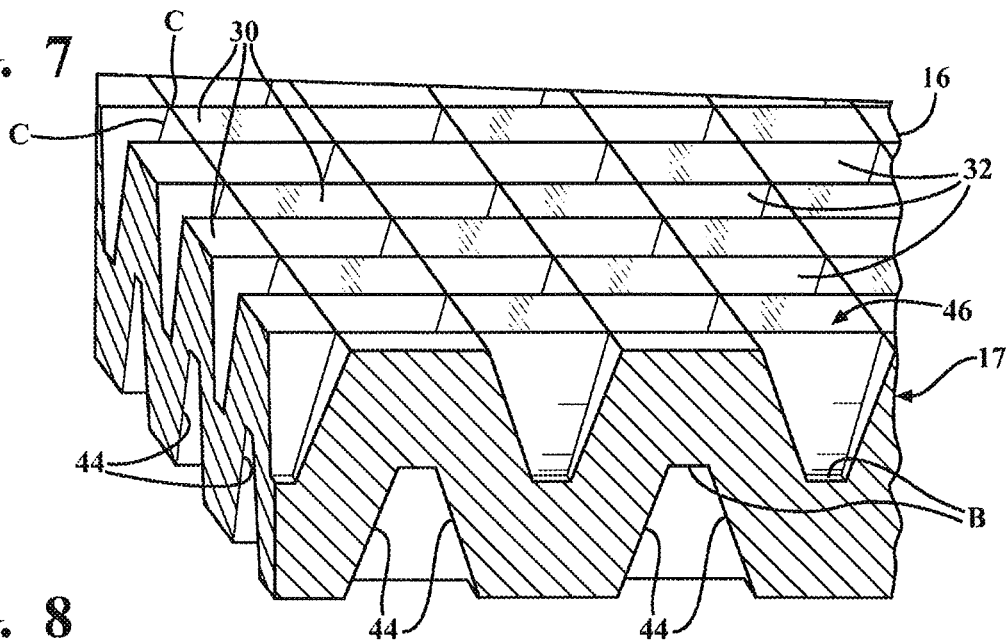
FIGS. 7-9 are fragmentary perspective views of stopper regions of distance layers constructed in accordance with different embodiments of the invention.
Figure 8:
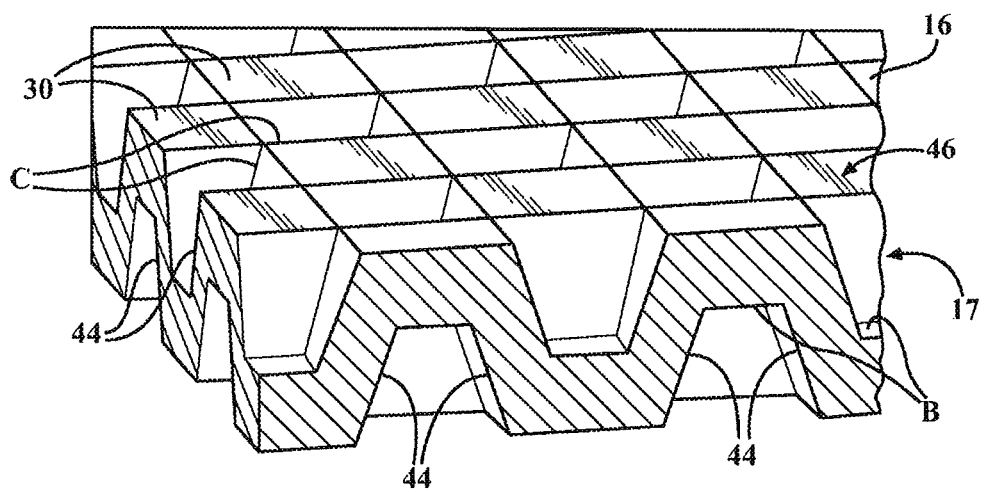
Figure 9:
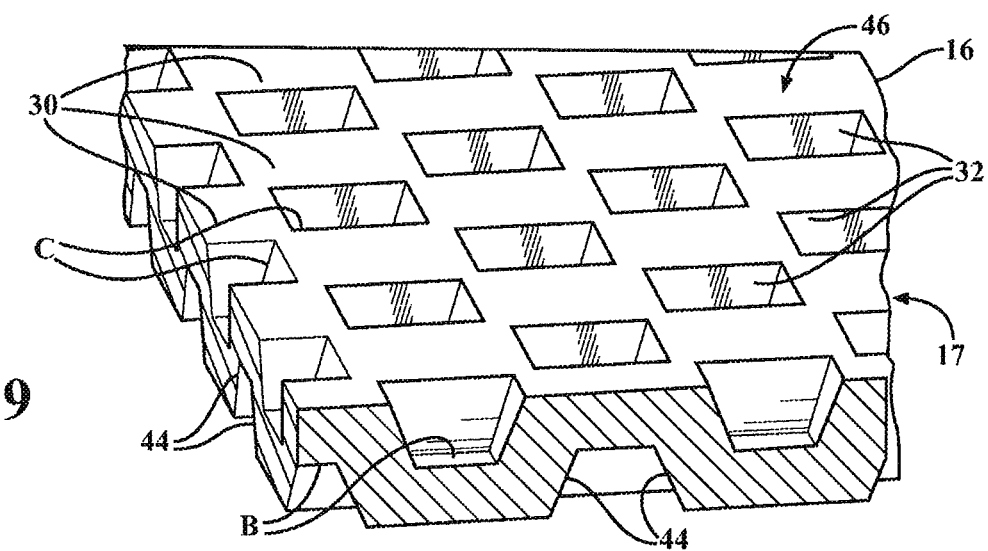

Each of the protrusions 30 is formed having an annular wall 44 extending about a corresponding one of the depressions 32. The annular wall 44 has a wall thickness (t1, shown in FIG. 2) that can be formed to be equal to, greater than, or less than the thickness (t) of the metal stopper layer 16. These options result due to the forming process that results as the projections 40 intermesh with one another. As such, the thickness (0) of the walls 44 can be precisely controlled, as desired, by controlling the relative spacing of the die projections 40 from one another upon fully compressing the dies 36, 38 toward one another. Accordingly, in one embodiment, the wall thickness (t1) can be reduced relative to the original thickness (t), as desired, and can be drawn or thinned to be about ⅓ the thickness (t) or more, if desired. Some different embodiments are illustrated in FIGS. 7-9, with FIG. 7 showing the depressions 44 on opposite sides of the distance layer 16 having bases B in coplanar or substantially coplanar relation with one another and having corners (C) immediately adjacent one another; with FIG. 8 showing the depressions 32 on opposite sides of the distance layer 16 having bases B extending beyond one another and having corners C immediately adjacent one another; and with FIG. 9 showing depressions 32 on opposite sides of the distance layer 16 having bases B in coplanar or substantially coplanar relation with one another and having corners C spaced from one another via material of intervening protrusions 30, thereby forming an enhanced stiffness, and thus, offering an ability to minimize the height of the protrusions 30, as shown.

Figure 2A:
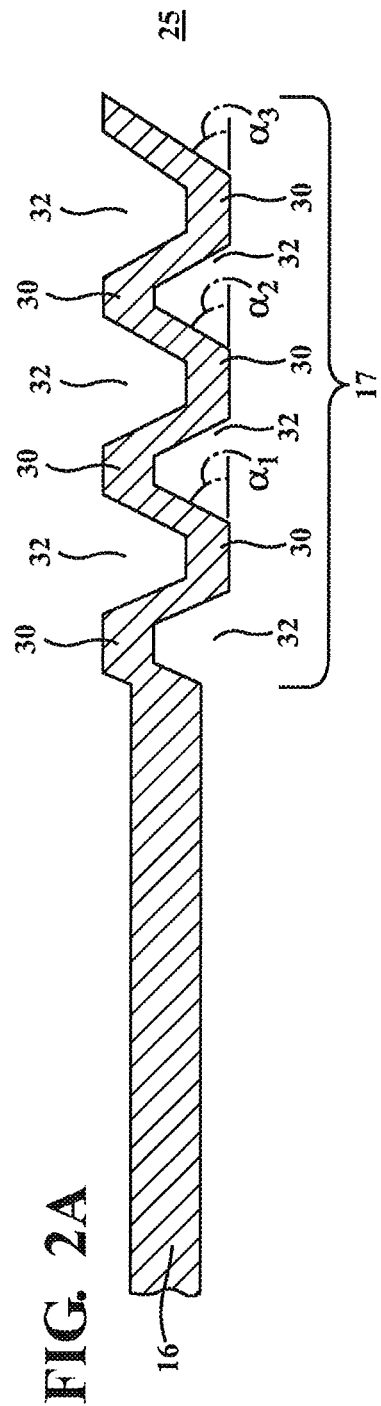
FIG. 2A is a fragmentary cross-sectional side view of a distance layer of a multilayer static gasket constructed in accordance with another aspect of the invention.
Figure 2B:
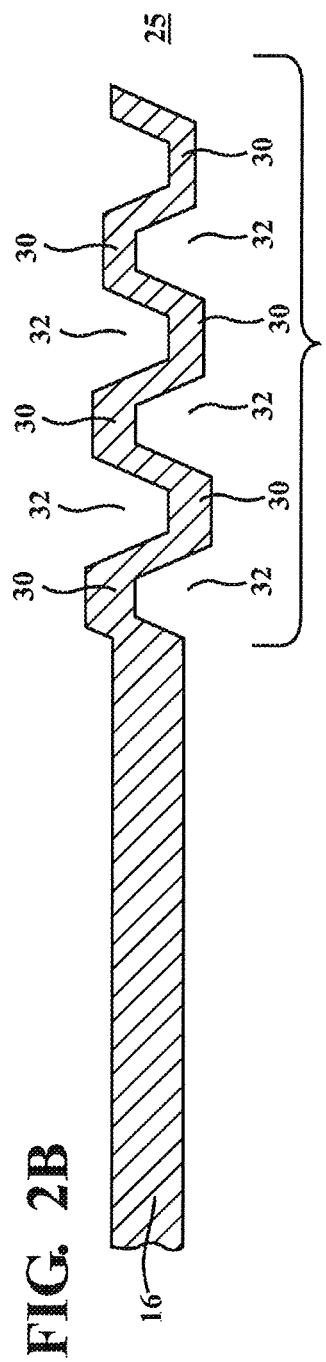
FIG. 2B is a fragmentary cross-sectional side view of a distance layer of a multilayer static gasket constructed in accordance with yet another aspect of the invention.
Figure 2C:
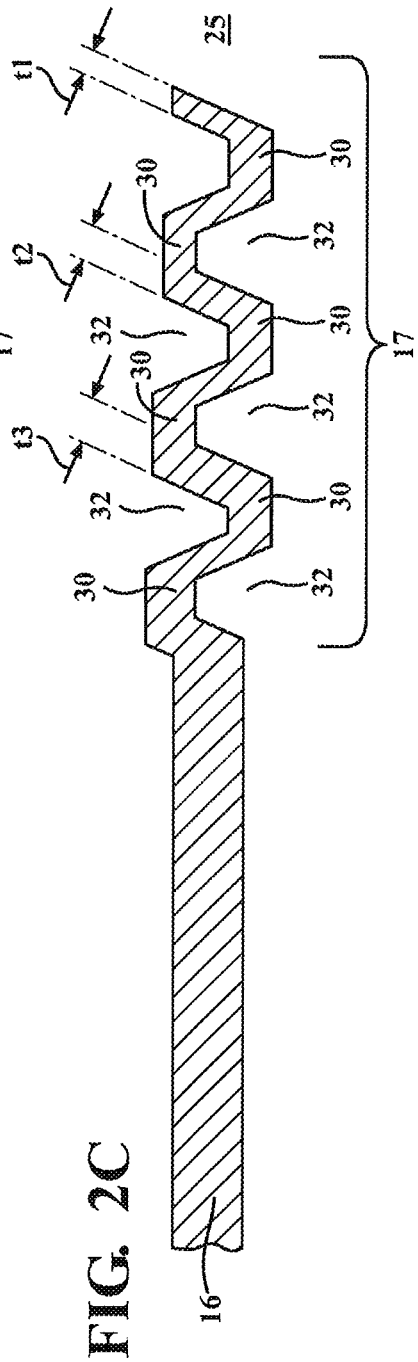
FIG. 2C is a fragmentary cross-sectional side view of a distance layer of a multilayer static gasket constructed in accordance with yet another aspect of the invention.
Figure 6:
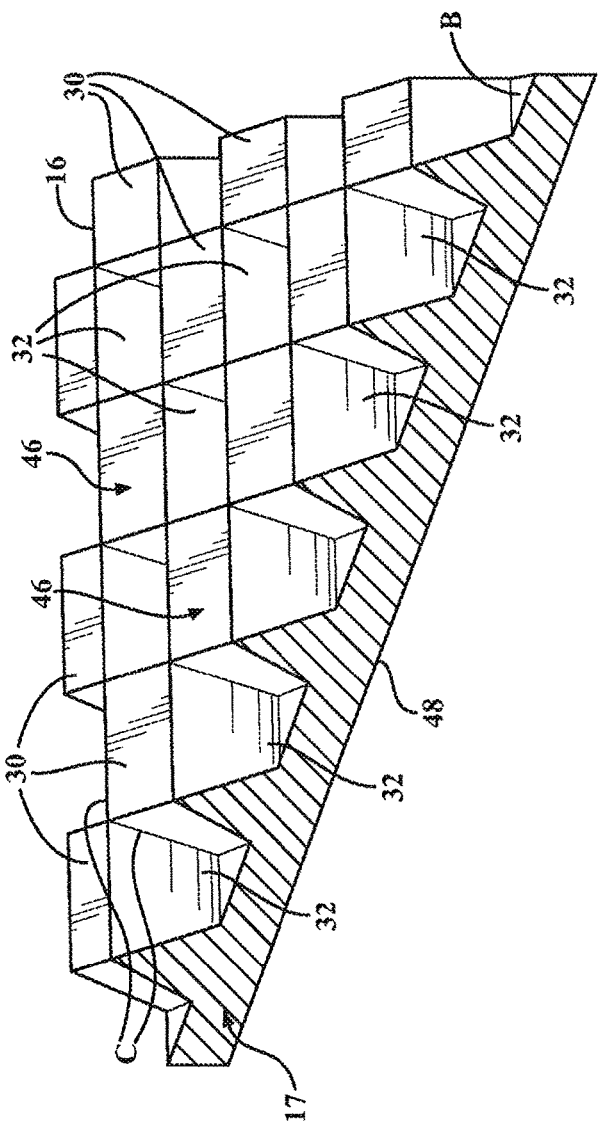
FIG. 6 is cross-sectional perspective view taken generally along the line 6-6 of FIG. 4.

In addition to the ability to thin the annular walls 44 relative to the distance layer thickness (t), the walls 44 can be inclined at an angle α, such that the walls 44 extend in oblique relation from the corresponding opposite sides 18, 20. As such, the walls 44 are generally conical or pyramid shaped, extending to a truncated plateau or substantially flat peak 46. Further, to accommodate for differing clamping loads across the gasket 10, and to fine tune the smooth load distribution applied across the seal beads 26, at least some of the annular walls 44 can be formed having a different compressive stiffness relative to one another. To provide the walls 44 having varying compressive stiffness relative to one another, at least some of the walls 44 on a common one of the sides 18, 20 can be inclined at different angles α relative to one another, such as shown, by way of example and without limitation, in FIG. 2A, wherein the angles $\alpha_1$, $\alpha_2$ and $\alpha_3$ decrease approaching the passage 25, such that $\alpha_1 > \alpha_2 > \alpha_3$. To further fine tune the smooth load distribution across the seal beads 26, at least some of the protrusions 30 can be formed having different heights extending outwardly from opposite parallel planes 33 of the opposite sides 18, 20, such as shown, by way of example and without limitation, in FIG. 2B, wherein the heights progressively decrease approaching the passage 25. Further yet, as shown, by way of example and without limitation, in FIG. 2C, at least some of the wall thicknesses can be varied from one another on a common one of the sides 18, 20, shown as thicknesses $t_1$, $t_2$ and $t_3$, with the thickness decreasing toward to the passage 25, such that $t_1 > t_2 > t_3$. In addition, the peaks 46 can be further processed in a secondary operation, also referred to as re-hitting, using a flat punch to establish the contour and height of the peak 46, if desired. Accordingly, the stopper region 17 of the distance layer 16 can be finely tuned by varying and controlling the density of the protrusions 30 and depressions 32, the heights and depths of the protrusions 30 and depressions 32, and angles α of the walls 44. Another feature enhancing the strength of the protrusions 30 is shown in the cross-section of FIG. 6. As can be seen, the inclined walls 44 and configuration of the peaks 46 such that lines of continuous material 48 along the neighboring peaks are provided.

Accordingly, as will be apparent to one possessing ordinary skill in the art of static gaskets, in view of the above description of currently preferred embodiments and alternatives thereto, many modifications and variations of the present invention are possible. Of course, it should be recognized that a separately formed stopper region, as discussed above, is contemplated herein, wherein the separately formed stopper region could be used by itself in combination with one or more functional layers, or it could be associated with a separate distance layer, such as being fixed thereto or disposed thereon. It is, therefore, to be understood that within the scope of the appended claims, the invention may be practiced otherwise than as specifically described.

What is claimed is:

1. A method of constructing a multilayer metal static gasket for establishing a gas/fluid-tight seal between two members to be clamped together, comprising:

forming a metal functional layer having at least one opening configured to surround a passage to be sealed and having a seal bead radially outwardly from and substantially surrounding the opening;

providing a metal distance layer having a thickness extending between opposite sides;

forming at least one distance layer opening through the opposite sides, with each distance layer opening being configured to register with one of the functional layer openings; and compressing the distance layer between a pair of dies and forming a plurality of depressions extending into each of the opposite sides and a plurality of protrusions extending outwardly from each of the opposite sides; and forming each of the protrusions to have an annular wall extending about a corresponding one of the depressions, and wherein at least some of the annular walls on a common one of the planar opposite sides have a different thickness and compressive stiffness relative to one another.

2. The method of claim 1 further including causing a cold flow and drawing of the metal distance layer during the compressing process.

3. The method of claim 1 further including drawing the material of the annular wall to have a wall thickness less than the thickness of other sections of the metal distance layer.

4. The method of claim 3 further including reducing the thickness of the annular wall to between about ½-⅓ of the thickness of the other sections of the metal distance layer.

5. The method of claim 1, wherein the step of forming each of the protrusions includes inclining each of the annular walls in oblique relation to the opposite sides.

6. The method of claim 5 further including forming at least some of the annular walls having different angles of inclination from one another.

7. The method of claim 1 further including forming at least some of the protrusions having different heights from one another and forming at least some of the depressions having different depths from one another.

8. The method of claim 1 further including forming at least some of the annular walls having a different stiffness relative to one another.

9. The method of claim 1, wherein the annular walls have a wall thickness less than the thickness of other sections of the metal distance layer.

\* \* \* \* \*